United States Patent
Ee et al.

(10) Patent No.: US 11,862,209 B2
(45) Date of Patent: Jan. 2, 2024

(54) LOAD BEAM INCLUDING SLIT FEATURE

(71) Applicant: Magnecomp Corporation, Murrieta, CA (US)

(72) Inventors: Kuen Chee Ee, Chino, CA (US); Long Zhang, Winchester, CA (US); David Glaess, Bangkok (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 17/866,377

(22) Filed: Jul. 15, 2022

(65) Prior Publication Data

US 2023/0020335 A1 Jan. 19, 2023

Related U.S. Application Data

(60) Provisional application No. 63/223,441, filed on Jul. 19, 2021.

(51) Int. Cl.
*G11B 5/48* (2006.01)

(52) U.S. Cl.
CPC .......... *G11B 5/4833* (2013.01); *G11B 5/4826* (2013.01)

(58) Field of Classification Search
CPC ............................. G11B 5/4826; G11B 5/4833
See application file for complete search history.

(56) References Cited

U.S. PATENT DOCUMENTS

| | | | | |
|---|---|---|---|---|
| 5,201,458 A * | 4/1993 | Hagen | ................. | B23K 26/22 360/234.6 |
| 5,299,081 A * | 3/1994 | Hatch | ................. | G11B 5/4833 360/234.6 |
| 5,452,158 A * | 9/1995 | Harrison | ............... | G11B 5/4826 |
| 5,530,606 A * | 6/1996 | Baasch | ................. | G11B 5/4826 |
| 5,748,409 A * | 5/1998 | Girard | ................. | G11B 5/4826 |
| 5,875,071 A * | 2/1999 | Erpelding | ............... | G11B 5/486 |
| 5,973,884 A * | 10/1999 | Hagen | ................. | G11B 5/4826 |
| 6,028,742 A | 2/2000 | Kazama | | |
| 6,154,952 A | 12/2000 | Tangren | | |
| 6,304,420 B1 * | 10/2001 | Murphy | ............... | G11B 5/4833 360/245.7 |
| 6,313,971 B1 * | 11/2001 | Takagi | ................. | G11B 5/6005 |
| 6,366,430 B1 * | 4/2002 | Narayan | ............... | G11B 5/4826 29/603.03 |
| 6,483,670 B1 * | 11/2002 | Watanabe | ............ | G11B 5/4833 |
| 6,900,966 B1 * | 5/2005 | Xu | ........................ | G11B 5/4826 360/244.9 |
| 7,365,945 B2 * | 4/2008 | Fujimoto | ............. | G11B 5/4833 360/255 |
| 7,706,106 B1 * | 4/2010 | Mei | ....................... | G11B 5/4833 360/255.5 |
| 7,724,476 B1 * | 5/2010 | Bjorstrom | ............ | G11B 5/4833 360/255 |

(Continued)

OTHER PUBLICATIONS

International Search Report and Written Opinion in International Application No. PCT/US2022/037507, dated Nov. 16, 2022.

*Primary Examiner* — Brian E Miller
(74) *Attorney, Agent, or Firm* — DLA Piper LLP (US)

(57) ABSTRACT

An improved load beam is described herein. In some embodiments, the load beam comprises a major surface including a proximal end and a distal end, the distal end including a tip weld, a dustpan, and a lift tab; side rails extending from the major surface and the dustpan; and a slit disposed on the major surface about the tip weld.

21 Claims, 2 Drawing Sheets

(56) References Cited

U.S. PATENT DOCUMENTS

| | | | |
|---|---|---|---|
| 7,791,840 B2* | 9/2010 | Horiuchi | G11B 5/4833 360/245 |
| 7,804,664 B1* | 9/2010 | Tokuda | G11B 5/54 360/255 |
| 7,983,006 B2* | 7/2011 | Fujiwara | G11B 5/486 360/245.9 |
| 8,064,167 B2* | 11/2011 | Fujimoto | G11B 5/4833 360/245.2 |
| 8,446,695 B1* | 5/2013 | Ee | G11B 5/4826 360/245.9 |
| 8,488,281 B1* | 7/2013 | Pan | G11B 5/4826 360/245.9 |
| 8,693,144 B1* | 4/2014 | Pan | G11B 5/4826 360/245.2 |
| 8,837,090 B2* | 9/2014 | Greminger | G11B 5/4833 360/245.7 |
| 8,913,347 B2* | 12/2014 | Takikawa | G11B 5/4873 360/245.3 |
| 9,007,726 B2 | 4/2015 | Bennin et al. | |
| 9,830,938 B1* | 11/2017 | Aoki | G11B 5/4833 |
| 2005/0030671 A1* | 2/2005 | Lee | G11B 5/4833 360/255 |
| 2005/0237670 A1* | 10/2005 | Fujimoto | G11B 5/4826 |
| 2006/0039084 A1* | 2/2006 | Kashima | G11B 5/4833 |
| 2006/0209465 A1 | 9/2006 | Takikawa et al. | |
| 2008/0144223 A1* | 6/2008 | Muraki | G11B 5/4853 360/244.8 |
| 2009/0190261 A1* | 7/2009 | Fujimoto | G11B 5/4833 360/244.2 |
| 2011/0090600 A1* | 4/2011 | Feng | G11B 5/4833 360/245.3 |
| 2011/0292543 A1 | 12/2011 | Miyake | |
| 2014/0022671 A1* | 1/2014 | Takikawa | G11B 5/4826 360/234.6 |
| 2014/0098440 A1* | 4/2014 | Miller | G11B 5/483 360/234.6 |
| 2017/0309303 A1* | 10/2017 | Aoki | G11B 5/4826 |
| 2021/0358518 A1* | 11/2021 | Ee | G11B 5/4826 |
| 2023/0020335 A1* | 1/2023 | Ee | G11B 5/4826 |

* cited by examiner

LOAD BEAM INCLUDING SLIT FEATURE

CROSS-REFERENCE TO RELATED APPLICATIONS

This application claims the benefit of, and priority to, U.S. Provisional Application No. 63/223,441 filed on Jul. 19, 2021, which is hereby incorporated by reference in its entirety.

FIELD

This disclosure relates to the field of suspensions for hard disk drives. More particularly, this disclosure relates to the field of load beams for hard disk drives.

BACKGROUND

In a disk storage device, a rotating disk is employed to store information. Disk storage devices typically include a frame to provide attachment points and orientation for other components, and a spindle motor mounted to the frame for rotating the disk. A head slider includes a read/write head for writing and reading data to and from the disk surface. The head slider is supported and properly oriented in relationship to the disk by a suspension that provides both the force and compliance necessary for proper head slider operation. As the disk in the storage device rotates beneath the head slider and head suspension, the air above the disk also rotates, thus creating an air bearing which acts with an aerodynamic design of the suspension to create a lift force. The lift force is counteracted by a spring force of the suspension, thus positioning the head slider at a desired height and alignment above the disk which is referred to as the fly height.

Suspensions for disk drives include a load beam and a flexure. The load beam typically includes a mounting region for mounting the suspension to an actuator of the disk drive, a rigid region, and a spring region between the mounting region and the rigid region. The spring region provides a spring force to counteract the aerodynamic lift force generated on the suspension during the drive operation as described above. The flexure typically includes a gimbal region having a slider mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

SUMMARY

An improved load beam is described herein. According to some embodiments of the present disclosure, the load beam comprises a major surface including a proximal end and a distal end, the distal end including a tip weld, a dustpan, and a lift tab; side rails extending from the major surface and the dustpan; and a slit disposed on the major surface about the tip weld.

According to some embodiments of the present disclosure, a convex portion of the slit is distal to the tip weld.

According to some embodiments of the present disclosure, a dustpan forming line is disposed through the tip weld.

According to some embodiments of the present disclosure, the dustpan forming angle θ can be between 15 to 25°.

According to some embodiments of the present disclosure, the slit is in a semicircular shape about the tip weld.

According to some embodiments of the present disclosure, the slit is in a U-shape about the tip weld.

According to some embodiments of the present disclosure, the dustpan includes a proximal end and a distal end, the proximal end includes the dustpan forming line, and the distal end includes a lift tab.

According to some embodiments of the present disclosure, the lift tab is disposed distal of the dustpan.

According to some embodiments of the present disclosure, the major surface includes a dimple.

According to some embodiments of the present disclosure, the major surface includes a window.

A suspension comprising the load beam according to some embodiments of the present disclosure is also provided.

While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure and are therefore not to be considered as limiting of its scope. The principles are described and explained with additional specificity and detail using the following drawings.

DETAILED DESCRIPTION

Figure 1A:
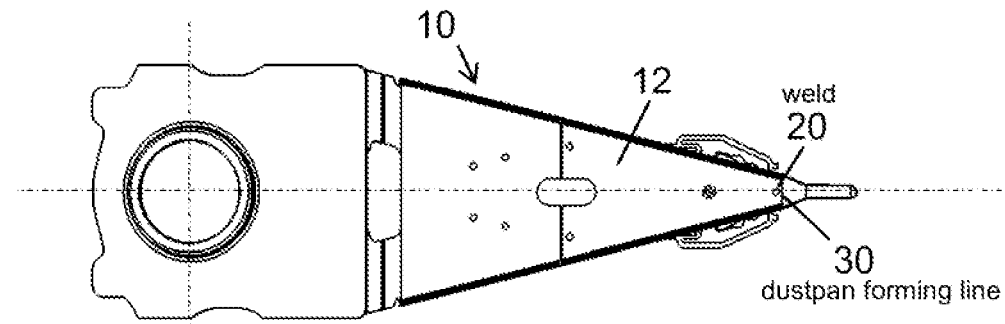
FIG. 1A is a top plan view of an exemplary suspension according to some embodiments of the present disclosure.

A load beam is described herein. The load beam according to some embodiments of the present disclosure is part of suspension for a magnetic disk drive unit. The disk drive unit includes a spinning magnetic or optical disk, which contains a pattern of magnetic ones and zeroes on it that constitutes the data stored on the disk drive. The magnetic or optical disk is driven by a drive motor. The disk drive unit, according to some embodiments, includes a suspension with a load beam, a base plate, and a gimbal to which a head slider is mounted proximate the distal end of the gimbal. The proximal end of a suspension or load beam is the end that is supported, i.e., the end nearest to a base plate which is swaged or otherwise mounted to an actuator arm. The distal end of a suspension or load beam is the end that is opposite the proximal end, i.e., the distal end is the cantilevered end.

The gimbal is coupled to a base plate, which in turn is coupled to a voice coil motor. The voice coil motor is configured to move the suspension arcuately in order to position the head slider over the correct data track on the magnetic disk. The head slider is carried on a gimbal, which allows the slider to pitch and roll so that it follows the proper data track on the spinning magnetic disk, allowing for such variations without degraded performance. Such variations typically include vibrations of the disk, inertial events such as bumping, and irregularities in the disk's surface.

In some embodiments, the gimbal described herein is part of a dual stage actuation (DSA) suspension. The DSA suspension can include a base plate and a load beam. The load beam includes a gimbal. The gimbal can include mounted actuators and a gimbal assembly. The actuators are operable to act directly on the gimbaled assembly of the DSA suspension that is configured to include the read/write head slider.

In some embodiments, the gimbal can include at least one actuator joint configured to receive an actuator. The gimbal, according to some embodiments, includes two actuator joints, located on opposing sides of the gimbal. Each actuator joint includes actuator mounting shelves.

In some embodiments, each actuator spans the respective gap in the actuator joint. The actuators are affixed to the slider tongue by an adhesive. The adhesive can include conductive or non-conductive epoxy strategically applied at each end of the actuators. The positive and negative electrical connections can be made from the actuators to the gimbal by a variety of techniques. When the actuator is activated, it expands or contracts producing movements of the read/write head that is mounted at the distal end of suspension thereby changing the length of the gap between the mounting ends.

In some embodiments, the suspension can be configured as a single-stage actuation suspension, a dual-stage actuation device, a tri-stage actuation device or other configurations. In some embodiments, the tri-stage actuation suspension includes actuators respectively located at the mount plate region and on the gimbal at the same time. Conceivably, any variation of actuators can be incorporated onto the suspension for the purposes of the examples disclosed herein. In other words, the suspension may include more or less components than those shown without departing from the scope of the present disclosure. The components shown, however, are sufficient to disclose an illustrative example for practicing the disclosed principles.

Figure 1B:
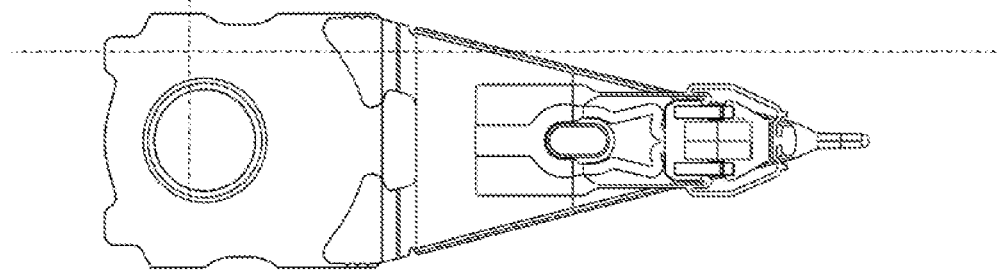
FIG. 1B is a bottom plan view of an exemplary suspension according to some embodiments of the present disclosure.
Figure 2:
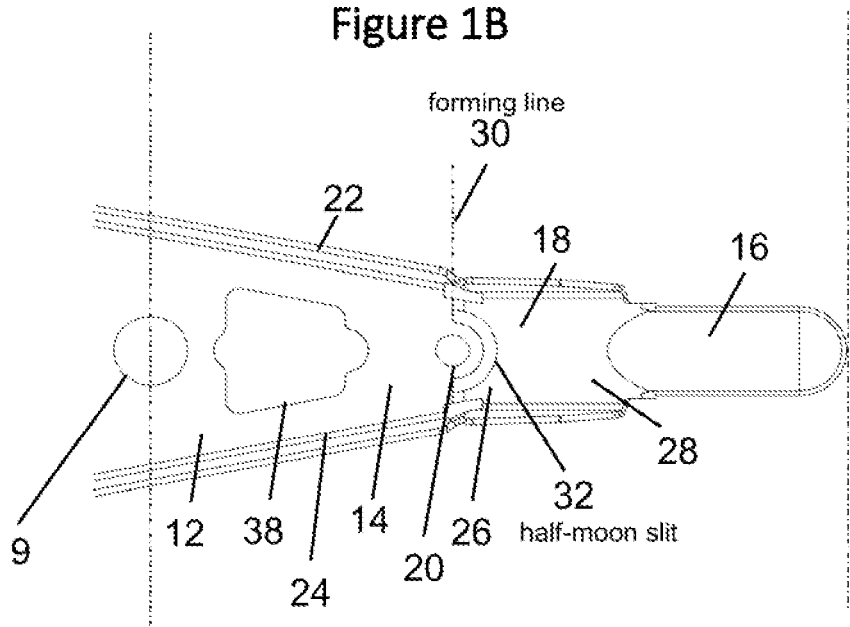
FIG. 2 is a top plan view of an exemplary load beam according to some embodiments of the present disclosure.

As shown in greater detail in FIGS. 1 and 2, the suspension 10 comprises a plurality of separate components that are mounted together. Suspension 10 includes a load beam 12 to which a flexure is mounted. The load beam 12 is a generally planar structure formed from a metal substrate, such as stainless steel. The load beam 12 includes a major surface 14 (e.g., a top or bottom surface of the load beam 12) that is flat and extends over a large portion of the load beam 12. The load beam 12 is generally rigid such that the different sections of the major surface 14 do not move relative to one another during normal operation of the suspension 10. The major surface is interrupted by various features, such as a window 38 as shown in FIG. 2. The load beam 12 can also include other windows. The windows are open on a first side (e.g., the top side) and a second side (e.g., the bottom side) of the load beam 12 by extending through the substrate of the load beam 12. The windows can be used for alignment during assembly, the windows can lighten and/or strengthen the load beam 12, and/or other components can extend through one or more of the windows.

The load beam 12 includes a mounting region at its proximal end, to which a base plate is mounted. The mounting region and base plate are mounted to the actuator arm of a disk drive unit in a known manner. The load beam 12 further includes a rigid region at the distal portion of the load beam 12 and a spring region located proximal of the rigid region and distal of the mounting region. A flexure is mounted to the rigid region of the load beam 12 and provides a resilient connection between the load beam 12 and slider.

The spring region of load beam 12 provides a desired gram load that opposes the force exerted upon the slider by the air bearing generated by a rotating disk. Toward this end, the spring region can include a preformed bend or radius that provides a precise gram load force. The gram load is transmitted to the flexure through the rigid region of the load beam 12. A dimple 9 can extend between the rigid region of the load beam 12 and the flexure to provide a point of transfer for the gram load.

In some embodiments, the load beam 12 include side rails 22, 24. In some embodiments, the side rails 22, 24 have high lateral stiffness to attain high torsion and sway frequency. In some embodiments, the side rails 22, 24 are made of stainless steel. In some embodiments, the side rails 22, 24 generally extend orthogonal from the load beam 12. In some embodiments, the load beam 12 and the side rails 22, 24 constitute a unitary piece. In some embodiments, the load beam 12 and the side rails 22, 24 constitute a unitary piece of stainless steel.

In some embodiments, a distal end of the load beam 12 includes a dustpan 18 and a lift tab 16. In some embodiments, the dustpan 18 includes a proximal end 26 and a distal end 28. In some embodiments, the lift tab 16 is disposed on a distal end 28 of the dustpan 18. In other words, the lift tab 16 is distal of the dustpan 18. In some embodiments, a proximal end 26 defines a dustpan forming line 30 between the dustpan 18 and the major surface 14 of the load beam 12.

In some embodiments, the side rails 22, 24 also extend from the dustpan 18. In some embodiments, the side rails 22, 24 generally extend orthogonal from the dustpan 18.

In some embodiments, a distal end 28 of the load beam 12 further includes a tip weld 20. In some embodiments, the tip weld 20 is disposed on the major surface 14 that is flat. The dustpan forming line in conventional load beams (without the slit), are disposed distal to the tip weld. In some embodiments of the present disclosure, the dustpan forming line 30 extends through the tip weld 20. In other words, the dustpan forming line 30 is shifted towards the dimple 9 relative to conventional load beams (without the slit). For some embodiments, the dustpan forming line 30 is shifted by 0.05 mm to 0.5 mm towards the dimple 9 relative to conventional load beams. As shown in FIG. 2, the dustpan forming line 30 is shifted towards the dimple 9 by 0.1 mm relative to the dustpan forming line in conventional load beams (without the slit).

Figure 4:
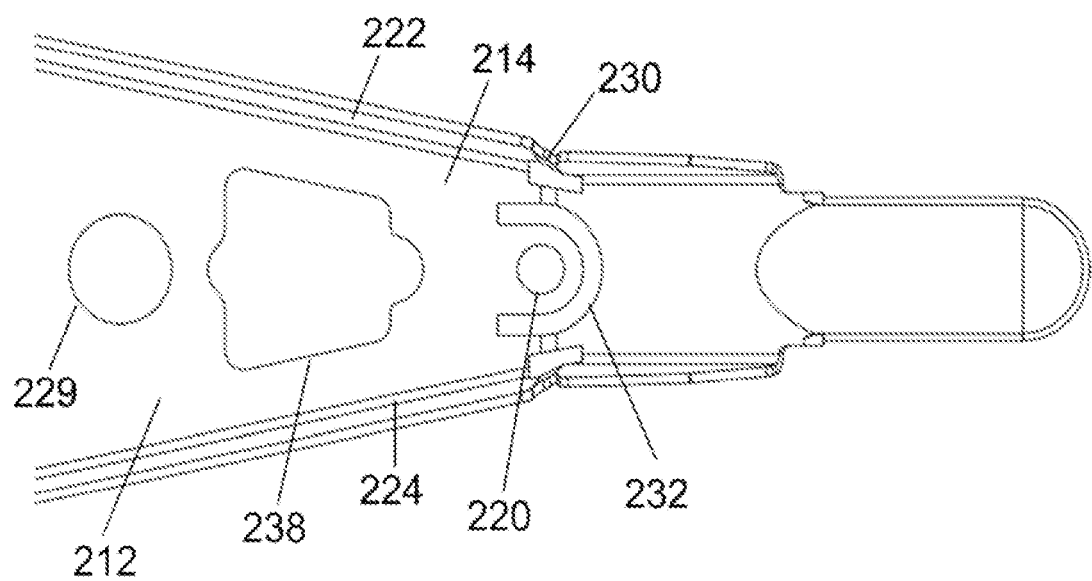
FIG. 4 is a top plan view of a second exemplary load beam according to some embodiments of the present disclosure.

In some embodiments, a distal end of the load beam 12 further includes a slit 32 disposed about the tip weld 20. In some embodiments, the slit 32 is disposed on the major surface 14 that is flat. In some embodiments, the slit 32 is in the shape of a semicircle, as shown in FIG. 2. In some embodiments, the slit 32 is a U-shape, as shown in FIG. 4. In some embodiments, a convex portion of the slit 32 (e.g., in the semicircular shape or U-shape) is distal of the tip weld 20.

Due to the additional tip weld in the distal end of the load beam, the load beam dustpan forming line is shifted towards the lift tab (i.e., distal to the tip weld) in conventional load beams. To maintain the same length of the load beam, the dustpan forming angle is increased to achieve the targeted lift tab offset height. However, the increased dustpan forming angle in conventional load beams can easily cause the potential buckling in the load beam rails due to the excessive load beam material deformation.

Without being bound to any particular theory, the improved load beam 12 alleviates the buckling issue of the side rails 22, 24 of the load beam 12. The slit 32 allows for the dustpan forming line 30 to be shifted towards the dimple 9 relative to conventional load beams (i.e., shifted away from the lift tab 16). The slit 32 also allows for the dustpan forming angle θ to be decreased relative to conventional load beams (without the slit), thereby alleviating the buckling issue of the side rails at the dustpan forming line in conventional load beams.

Figure 3:
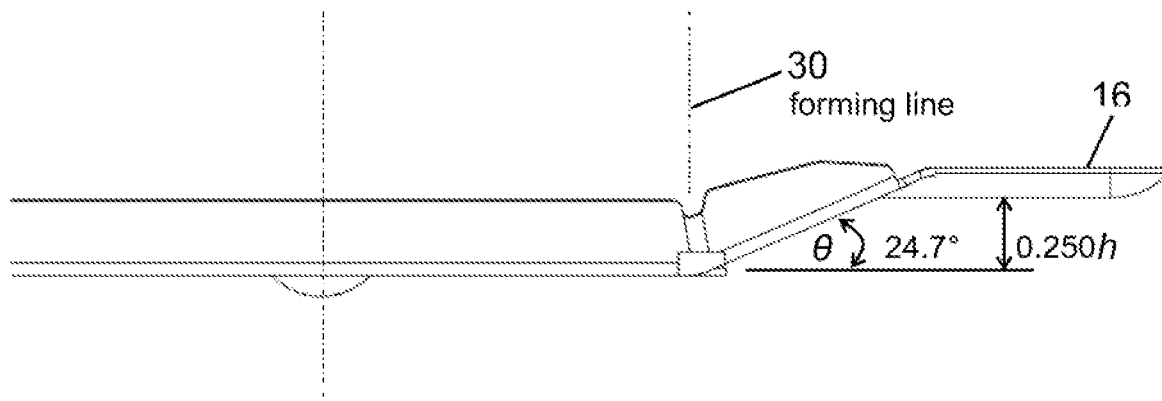
FIG. 3 is a side view of an exemplary load beam according to some embodiments of the present disclosure.

In some embodiments, the dustpan forming angle θ can be decreased from 2.0° to 8.0° relative to the dustpan forming angle θ in conventional load beams (without the slit) while a lift tab offsetting height h can be maintained. In some embodiments, the dustpan forming angle θ can be decreased from 4.0° to 8.0° relative to the dustpan forming angle θ in conventional load beams (without the slit). In other words, the dustpan forming angle θ of the exemplary embodiment of FIG. 2 is less than the dustpan forming angle θ of conventional load beams (without the slit). As illustrated in FIG. 3 the slit 32 allows for the dustpan forming angle θ to be decreased to 24.7°, while the lift tab offsetting height h is maintained, which for some embodiments is 0.250 mm. In some embodiments, the dustpan forming angle θ can be between 15 to 25°, 18 to 25°, or 20 to 25°. Furthermore, the slit 32 is narrow in width and is disposed on the major surface 14 that is flat, which allows for the stiffness of the lift tab 16 to be maintained.

FIG. 4 shows a second exemplary embodiment of the load beam 212. As shown in FIG. 4, the dustpan forming line 230 is shifted towards the dimple 229 relative to the dustpan forming line in conventional load beams (without the slit). In some embodiments, the dustpan forming line 230 is shifted towards the dimple 229 by more than the exemplary embodiment of FIG. 2 (i.e., more than 0.1 mm) relative to the dustpan forming line in conventional load beams (without the slit). In some embodiments, a distal end of the load beam 212 further includes a slit 232 disposed about the tip weld 220. In some embodiments, the slit 232 is disposed on the major surface 214 that is flat. In some embodiments, the slit 232 is a U-shape, as shown in FIG. 4. In some embodiments, a convex portion of the slit 232 is distal of the tip weld 220. In some embodiments, the load beam 212 also includes a window 238.

In some embodiments, the dustpan forming angle θ can be decreased from 2.0° to 8.0° relative to the dustpan forming angle θ in conventional load beams (without the slit) while a lift tab offsetting height h can be maintained. In some embodiments, the dustpan forming angle θ can be decreased from 4.0° to 8.0° relative to the dustpan forming angle θ in conventional load beams (without the slit). In some embodiments, the dustpan forming angle θ can be decreased more than the exemplary embodiment of FIG. 2 (i.e., more than 4.0°) relative to the dustpan forming angle θ in conventional load beams (without the slit). In other words, the dustpan forming angle θ of the exemplary embodiment of FIG. 4 is less than the dustpan forming angle θ of the exemplary embodiment of FIG. 2 (i.e., less than 24.7°) as well as the dustpan forming angle θ in conventional load beams (without the slit). In some embodiments, the dustpan forming angle θ can be between 15 to 25°, 18 to 25°, or 20 to 25°. Without being bound to any particular theory, the improved load beam 212 alleviates the buckling issue of the side rails 222, 224 of the load beam 212.

The load beam according to embodiments described here are configured to be used with hard drive suspensions including those described herein.

While multiple examples are disclosed, still other examples within the scope of the present disclosure will become apparent to those skilled in the art from the detailed description provided herein, which shows and describes illustrative examples. Accordingly, the drawings and detailed description are to be regarded as illustrative in nature and not restrictive. Features and modifications of the various examples are discussed herein and shown in the drawings. While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

What is claimed is:

1. A load beam comprising:
    a major surface including a proximal end and a distal end, the distal end including a tip weld, a dustpan, and a lift tab;
    side rails extending from the major surface and the dustpan; and
    a slit disposed on the major surface about the tip weld, wherein the tip weld is disposed at a dustpan forming line between the major surface and the dustpan.

2. The load beam of claim 1, wherein a convex portion of the slit is distal to the tip weld.

3. The load beam of claim 1, wherein a dustpan forming line is disposed through the tip weld or through the proximal end of the tip weld.

4. The load beam of claim 1, wherein the dustpan forms an angle θ that is between 15 to 25°.

5. The load beam of claim 1, wherein the slit is in a semicircular shape about the tip weld.

6. The load beam of claim 1, wherein the slit is in a U-shape about the tip weld.

7. The load beam of claim 1, wherein the dustpan includes a proximal end and a distal end, the proximal end includes the dustpan forming line, and the distal end includes a lift tab.

8. The load beam of claim 7, wherein the lift tab is disposed distal of the dustpan.

9. The load beam of claim 1, wherein the major surface includes a dimple.

10. The load beam of claim 1, wherein the major surface includes a window.

11. A suspension comprising:
    a load beam comprising:
        a major surface including a proximal end and a distal end, the distal end including a tip weld, a dustpan, and a lift tab;
        side rails extending from the major surface and the dustpan; and
        a slit disposed on the major surface about the tip weld, wherein the tip weld is disposed at a dustpan forming line between the major surface and the dustpan.

12. The suspension of claim 11, wherein a convex portion of the slit is distal to the tip weld.

13. The suspension of claim 11, wherein the dustpan forming line is disposed through the tip weld.

14. The suspension of claim 11, wherein the dustpan forms an angle θ that is between 15 to 25°.

15. The suspension of claim 11, wherein the slit is in a semicircular shape about the tip weld.

16. The suspension of claim 11, wherein the slit is in a U-shape about the tip weld.

17. The suspension of claim 11, wherein the dustpan includes a proximal end and a distal end, the proximal end includes the dustpan forming line, and the distal end includes a lift tab.

18. The suspension of claim 17, wherein the lift tab is disposed distal of the dustpan.

19. The suspension of claim 11, wherein the major surface includes a dimple.

20. The suspension of claim 11, wherein the major surface includes a window.

21. A suspension comprising:
a load beam, the load beam including a mounting region at a proximal end of the load beam and a rigid region at a distal portion of the load beam;
a base plate, the base plate mounted to the mounting region of the load beam; and
a flexure, the flexure mounted to the rigid region of the load beam, wherein the load beam further comprises:
a major surface including a proximal end and a distal end, the distal end including a tip weld, a dustpan, and a lift tab;
side rails extending from the major surface and the dustpan;
and a slit disposed on the major surface about the tip weld, wherein the tip weld is disposed at a dustpan forming line between the major surface and the dustpan.

\* \* \* \* \*